Patented Mar. 20, 1945

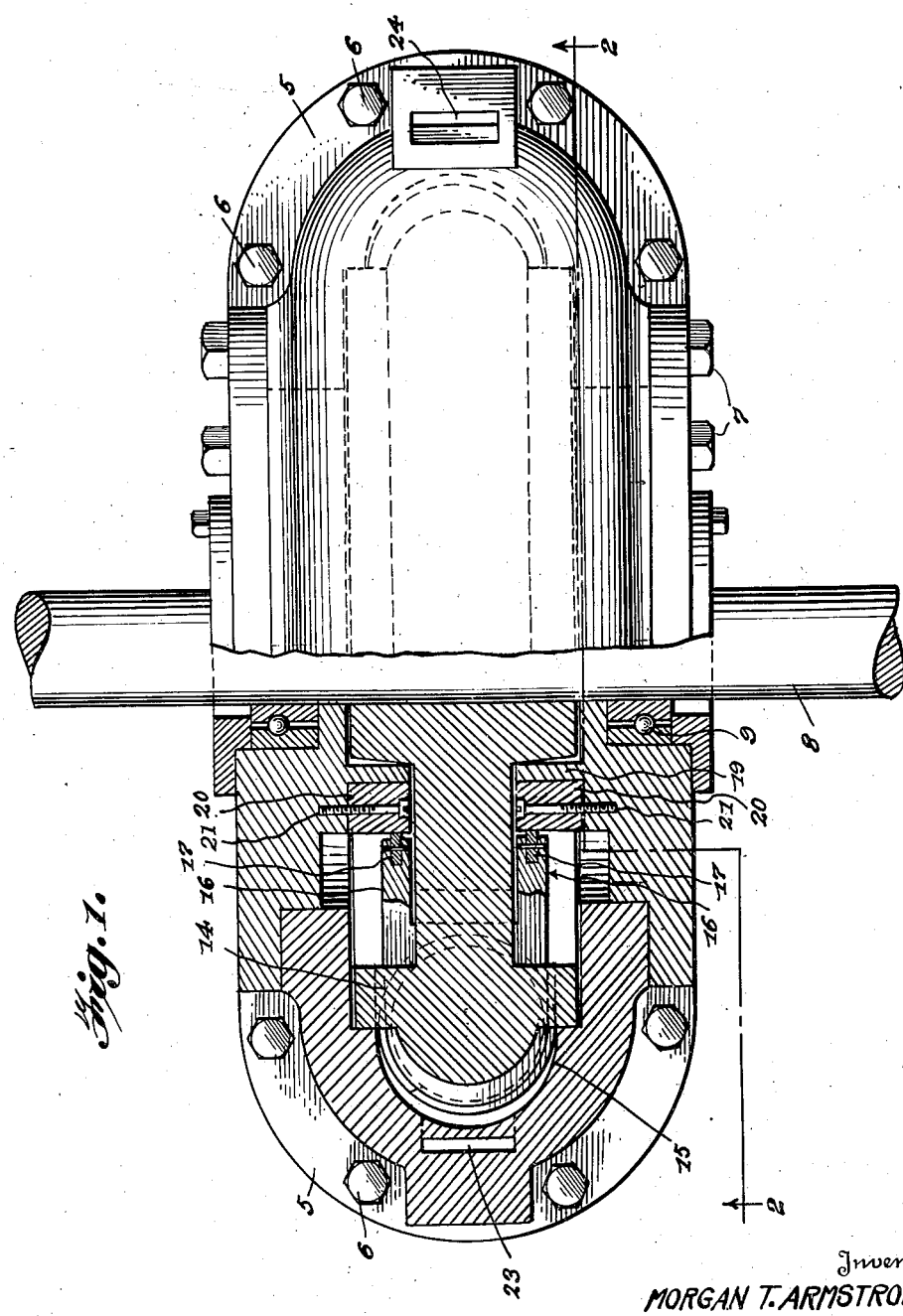

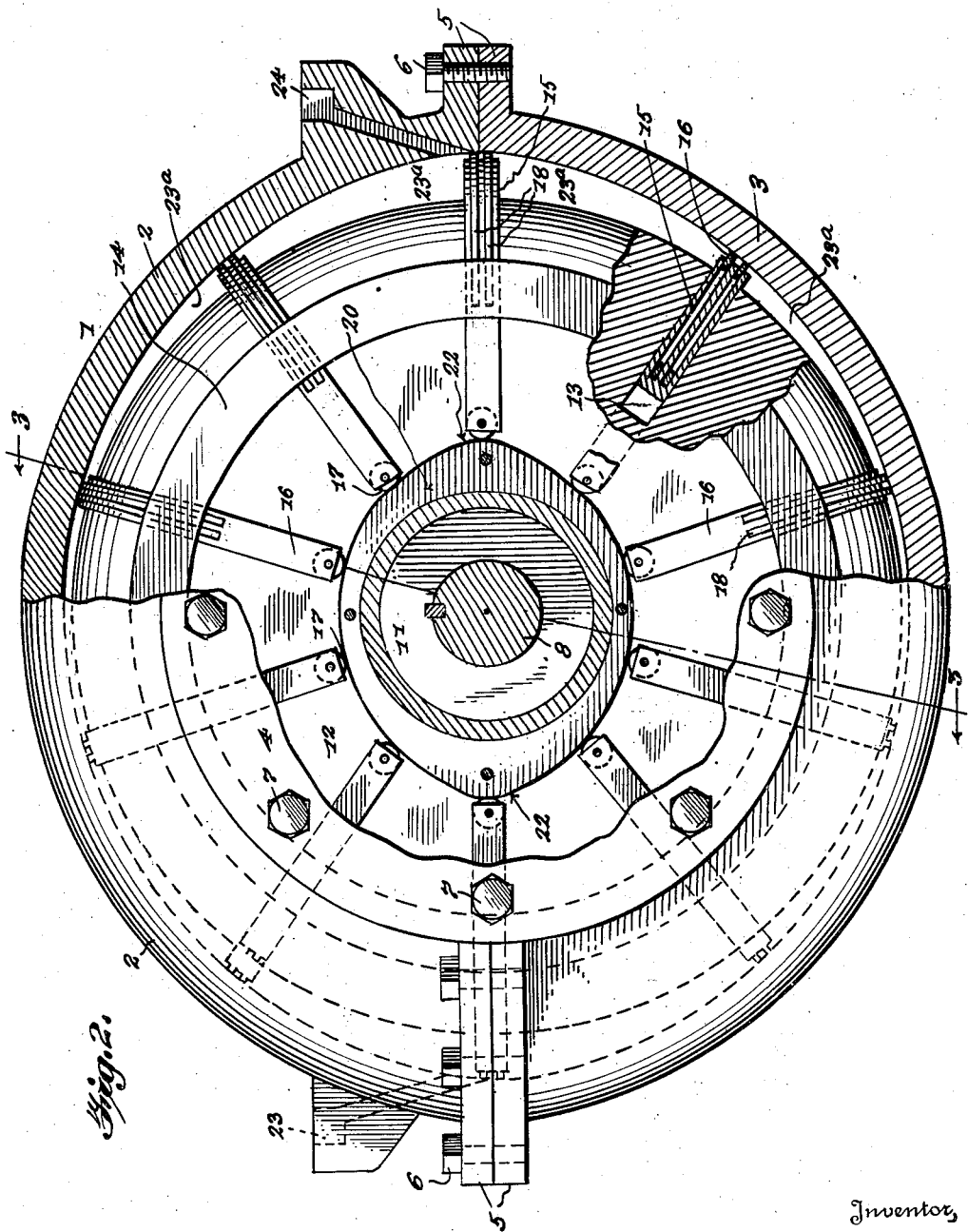

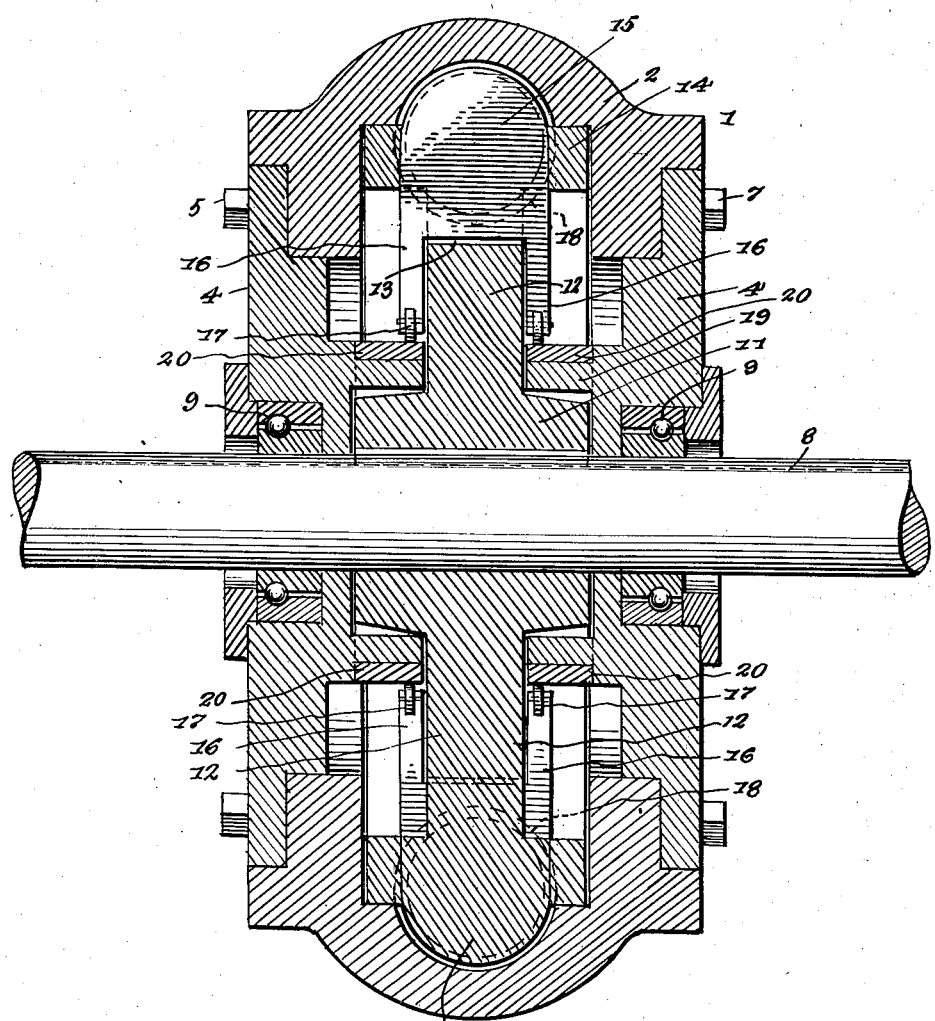
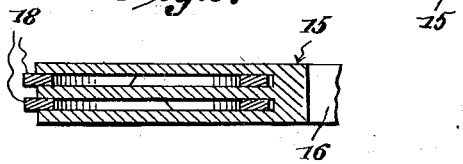

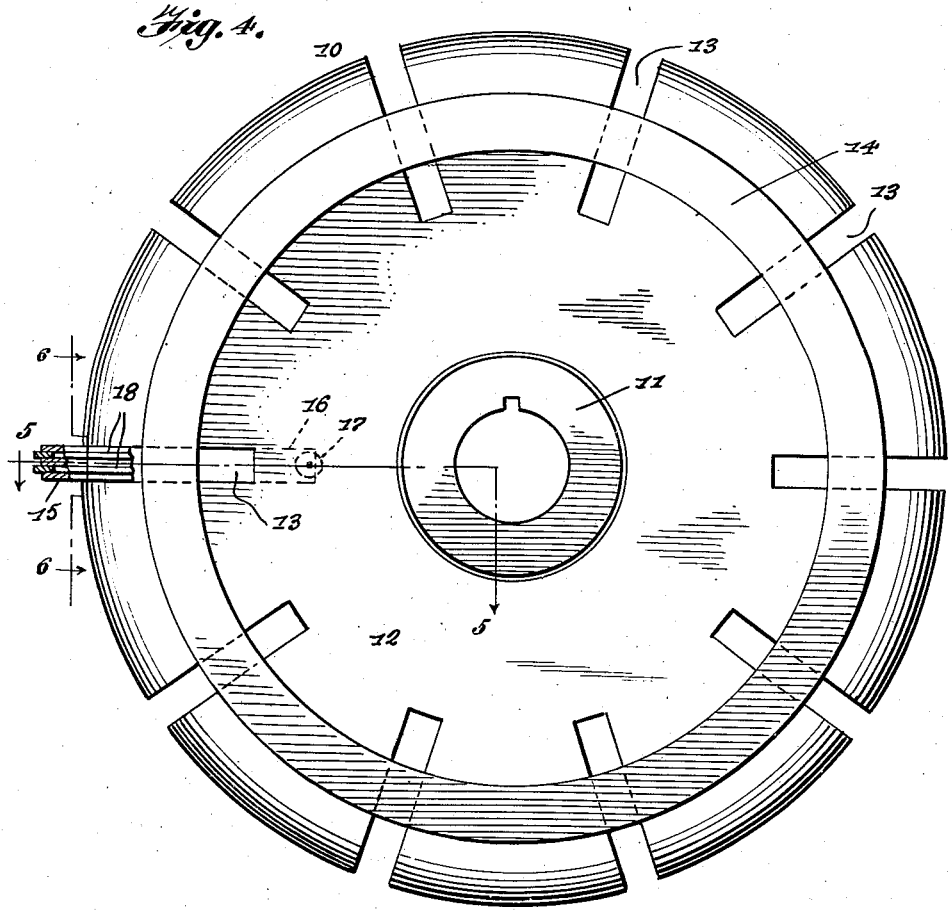
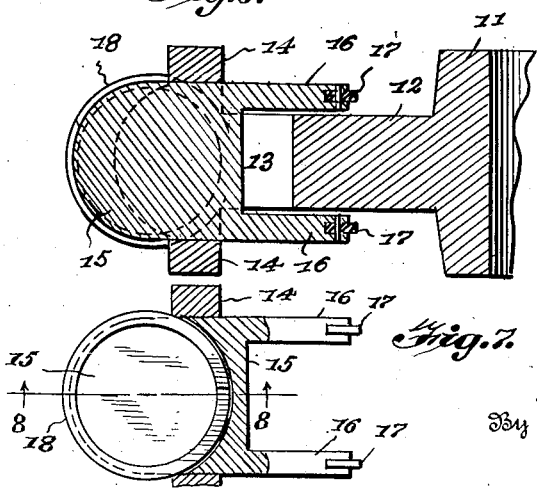
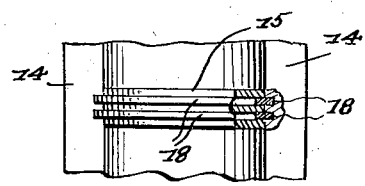

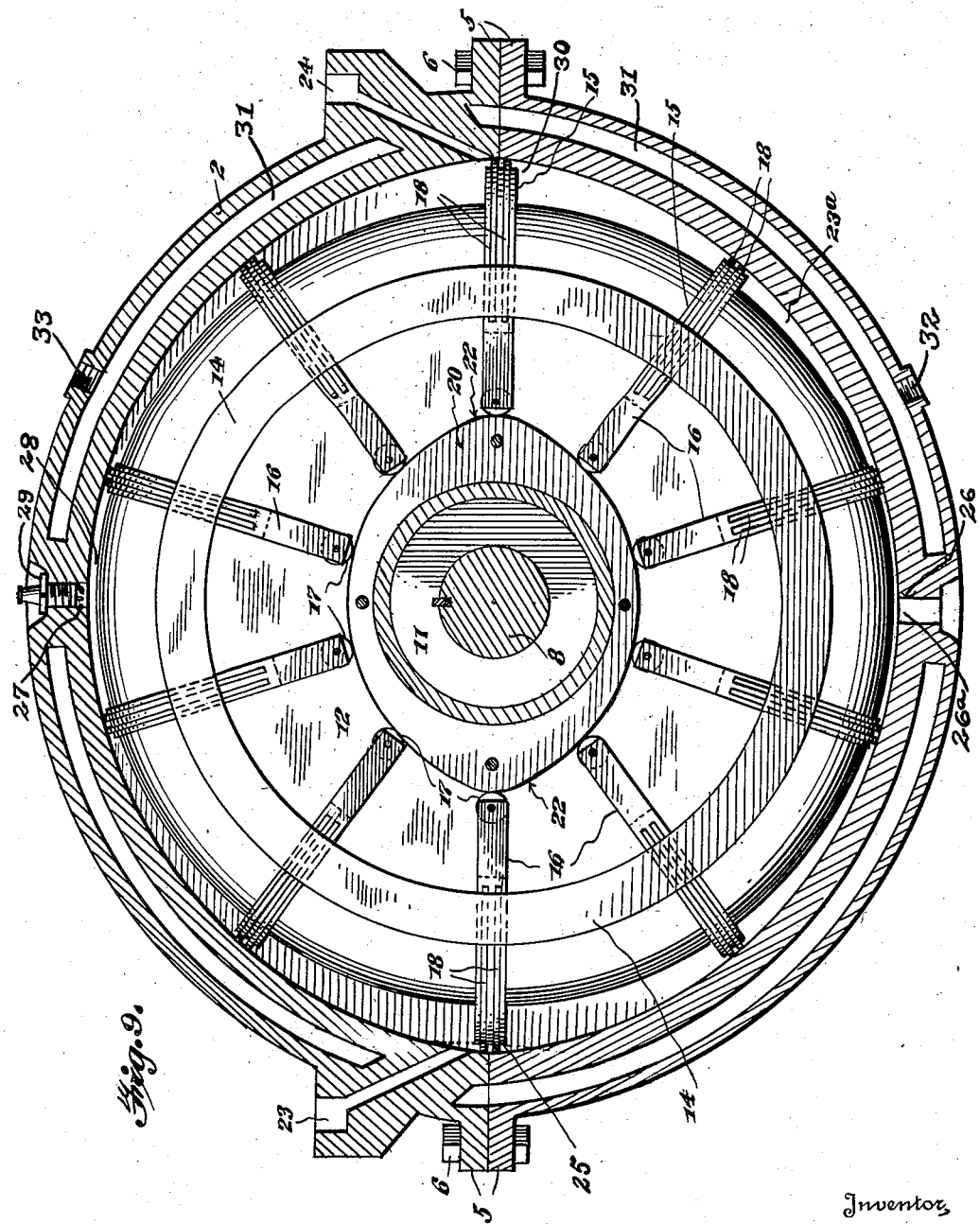

2,371,942

UNITED STATES PATENT OFFICE 2,371,942

ROTARY ENGINE

Morgan T. Armstrong, San Bruno, Calif.

Application February 20, 1943, Serial No. 476,579

1 Claim. (Cl. 103—136)

This invention relates to a motor, and an object of the invention is the production of a simple and compact mechanism so as to attain more efficiency due to the reduction of reciprocation, and to reduce lost motion to the minimum.

Another object of the invention is the construction of a mechanism which can be easily used as an air compressor with high and low stages in one unit, or as a rotary pump used for pressure or volume, or as a steam driven turbine, or as an internal combustion engine.

A still further object of the invention is the production of a motor mechanism which is efficient in operation, comparatively inexpensive to manufacture, and durable in construction.

With the foregoing and other objects in view, my invention comprises certain novel constructions, combinations, and arrangements of parts as will be hereinafter fully described, illustrated in the accompanying drawings, and more particularly pointed out in the appended claim.

In the drawings:

Figure 1 is a view partly in plan and partly in horizontal section of a mechanism constructed in accordance with the present invention.

Figure 2 is a sectional view taken on line 2—2, Figure 1, and looking in the direction of the arrows.

Figure 3 is a sectional view taken on line 3—3, Figure 2, and looking in the direction of the arrows.

Figure 4 is a view in side elevation of the rotor.

Figure 5 is a sectional view taken on line 5—5, Figure 4, and looking in the direction of the arrows.

Figure 6 is a sectional view taken on line 6—6, Figure 4, and looking in the direction of the arrows.

Figure 7 is a sectional view of one of the slidable pistons showing particularly the circular piston ring.

Figure 8 is a sectional view taken on line 8—8, Figure 7, and looking in the direction of the arrows.

Figure 9 is a vertical longitudinal sectional view of another embodiment of this invention showing an internal combustion engine.

Referring to the drawings, in which the preferred embodiments of this invention are illustrated, 1 designates a casing that can be mounted in any desired manner upon a support. The casing 1 comprises top section 2, bottom section 3, and two side sections 4. The top and bottom sections are securely fastened together by flanges 5 and bolts 6. The side sections 4 are secured in position upon the top and bottom sections 2 and 3 by means of bolts 7 and any other suitable fastening means that the constructor may desire.

A shaft 8 extends through the casing 1 and is preferably journalled upon ball bearings 9.

A rotor 10 is suitably keyed upon shaft 8. The rotor 10 comprises a hub 11, a relatively narrow body 12 that is machined and rounded upon its outer portion, and said rotor is provided with inwardly extending slots 13. The body of the rotor is provided with integral outwardly-extending annular flanges 14 upon its sides. These flanges 14 extend across the slots 13 near the center of said slots, as is plainly shown in Figure 4. Within the slots 13 are slidably mounted pistons 15. Each sliding piston 15 travels back and forth in the slot 13 in which it is mounted, and said piston is provided with two comparatively flat legs 16 that straddle portions of the body of the rotor 10. On the outer end of each leg 16 of the piston is a rotary unit 17, such as a roller, or a ball (not shown), as the constructor prefers. Each sliding piston 15 is preferably provided with circular piston rings 18 (Fig. 7). The piston rings 18 fit in suitable grooves in the pistons 15, as shown. These piston rings 18 serve to make a perfect connection with the inner machine face or wall of the casing 1. The annular flanges 14 bear against machined portions of the inner wall of the casing 1, making a tight connection or joint as shown in Figures 1, 2, and 3.

On the inner faces of the two side sections 4 are integral, inwardly extending, annular flanges 19. Mounted on these flanges are cam rings 20. Bolts 21 (Fig. 1) extend through the cam rings 20 and into portions of the side sections, securing the cam rings in position. Each cam ring 20 is provided with two cam surfaces 22 (Fig. 2). The rotary units 17 travel over the cam rings 20 as the rotor rotates.

An inlet 23 is formed upon the top section 2 and an outlet 24 is also formed upon said top section. The steam or fluid under pressure, or air under pressure, etc. enters inlet 23 and strikes against the sliding pistons, causing the rotor to rotate; and when the fluid or steam or the like in the particular pocket 23a, Fig. 2, reaches the outlet 24, the same will be exhausted, and the particular pocket 23a constituted by each two contiguous pistons, the rotor and the casing, when emptied by said exhausting will continue to be emptied until it again reaches the inlet 23, whereupon it will be filled with the liquid or steam, and will not be exhausted until it reaches the outlet.

It is to be noted that the rotor has its outer surface machined concentric so as to conform with the arc of the cam rings to form a perfect sealing between the travelling or sliding pistons. By reason of the packing rings on the sliding pistons, the rings fit tightly against the wall of the casing as well as the annular flanges 14, so that the pocket between each two pistons is tightly sealed until it reaches the outlet or exhaust 24.

Referring to Figure 9: This internal combustion engine has an intake or suction position, a firing position, a secondary exhaust position, with a final complete exhaust all in one revolution. At 25, Fig. 9, is the position for a suction or intake, with the understanding that, when travelling pistons 16 straddle port openings 23 and 24, their width is greater than that of said port openings, so as not to cause short circuiting from one side to the other. Between 26 and 25 will be noticed the increasing of cubic displacement, causing a partial vacuum, hence the reason for the above-stated intake or suction. From 25 to 27 is the approach to compression position. The compression pressure is governed by the clearance at 28. The spark plug 29 (there is only one spark plug required in this engine) is located at the highest point of compression. The power effort is from 27 to 30. The secondary exhaust is at 30, although a full exhaust is not accomplished at this point, but remaining gases can be utilized on the decreasing displacement, as their pressure lowers until the final or complete exhaust at 26; the completeness of exhaust is governed by clearance at 26a. Water compartment or chamber 31 is formed in the casing 1, in which compartment cooling water is contained; the compartment 31 having an inlet 32 and an outlet 33. The compartment 31 could be used for air cooling if the operator desired.

From the foregoing the construction and operation of the motor will be clearly understood, as the construction is simple and efficient for the purposes desired.

While I have described the preferred embodiments of my invention and illustrated the same in the accompanying drawings, certain minor changes or alterations may appear to one skilled in the art to which this invention relates, during the extensive manufacture of the same, and I, therefore, reserve the right to make such alterations or changes as shall fairly fall within the scope of the appended claim.

What I claim is:

In a mechanism of the class described, the combination of a casing comprising top, bottom, and side sections, said side sections provided with integral inwardly-extending registering annular flanges, cam rings mounted upon and surrounding said flanges, horizontal bolts extending through said cam rings and into said side sections, said cam rings provided at opposite portions with cam surfaces, a shaft extending through said side sections, ball bearings supporting said shaft upon said side sections, a rotor within said casing and fixedly secured upon said shaft, said rotor comprising a hub and body, said hub surrounded by the annular flanges on said side sections, said rotor being provided in its body with a plurality of piston receiving slots, said rotor provided on its body with integral outwardly-extending annular flanges, said last-mentioned annular flanges extending across the middle of said slots, pistons slidably mounted within said slots, said pistons each provided with a pair of inwardly-extending legs, a pair of piston rings on the outer portion of each piston with portions of the rings engaging said annular flanges on said rotor, said rotor having its annular flanges only bearing against said top and bottom sections of said casing, said legs being provided on their outer ends with rotary units, said rotary units engaging and being adapted to travel over the outer edge or surface of said cam rings.

MORGAN T. ARMSTRONG.